(12) United States Patent
Shih

(10) Patent No.: US 7,296,098 B2
(45) Date of Patent: Nov. 13, 2007

(54) PORTABLE DATA CONVERTING AND PROCESSING STORAGE DEVICE WITH STANDARD INTERFACE WHEREIN THE BODY UNITY DOES NOT INCLUDE ANY BUILT-IN FLASH MEMORY

(75) Inventor: Hsuan-Ming Shih, Chungli (CN)

(73) Assignee: Taiguen Technology (Shen-Zhen), Co., Ltd., Shenzhen (CN)

( * ) Notice: Subject to any disclaimer, the term of this patent is extended or adjusted under 35 U.S.C. 154(b) by 418 days.

(21) Appl. No.: 10/500,421

(22) PCT Filed: Aug. 7, 2002

(86) PCT No.: PCT/CN02/00546

§ 371 (c)(1),
(2), (4) Date: Jun. 25, 2004

(87) PCT Pub. No.: WO03/056441

PCT Pub. Date: Jul. 10, 2003

(65) Prior Publication Data
US 2005/0182872 A1   Aug. 18, 2005

(30) Foreign Application Priority Data

| Dec. 29, 2001 | (CN) | ............ 01 2 79675 |
| Dec. 29, 2001 | (CN) | ............ 01 2 79676 |
| Jan. 23, 2002 | (CN) | ............ 02 2 01096 |
| Jun. 27, 2002 | (CN) | ............ 02 2 38009 |

(51) Int. Cl.
G06F 1/00 (2006.01)
G06F 13/00 (2006.01)
G06F 3/00 (2006.01)
H04L 9/10 (2006.01)

(52) U.S. Cl. ............ 710/13; 710/8; 710/63; 710/72; 710/73; 710/74; 710/103; 711/103; 711/115; 711/165; 713/185; 713/172; 726/9; 726/19; 726/20; 726/34

(58) Field of Classification Search .......... 710/8, 710/13, 63, 105, 72–74; 711/103, 115, 165; 713/185, 172; 726/9, 19, 20, 34
See application file for complete search history.

(56) References Cited

U.S. PATENT DOCUMENTS 6,216,230 B1 *  4/2001  Rallis et al. ............ 713/185
(Continued)

FOREIGN PATENT DOCUMENTS

WO   WO 01/39102   * 11/2001

*Primary Examiner*—Tammara Peyton
(74) *Attorney, Agent, or Firm*—J.C. Patents

(57) ABSTRACT

A portable data converting and processing device with standard data interface, wherein the data processor is a connector-controller, a conversion-controller with functional processing or an integrative or separate combination of them. The connector and the data processor are integrated to form the body unit, and an electric interface for an external unit is set in said body unit. The present invention comprises three modules: a standard interface, a processor and an optional external unit, which can construct communication between storage devices and PC. The processor can obtain the ability to access data from various cards. The present invention can ensure the controlling and transmitting of data, and the external unit, such as converting processor, infrared receiver, RF module or identification module, or the storage devices are the fittings of peripheries. The external unit can be assembled or disassembled conveniently, thus they can be produced and assembled industrially and can be changed and upgraded in using easily.

9 Claims, 11 Drawing Sheets

U.S. PATENT DOCUMENTS

| | | | |
|---|---|---|---|
| 6,654,841 B2 * | 11/2003 | Lin | 710/301 |
| 6,763,399 B2 * | 7/2004 | Margalit et al. | 710/13 |
| 6,772,233 B2 * | 8/2004 | Iida et al. | 710/13 |
| 7,011,247 B2 * | 3/2006 | Drabczuk et al. | 235/451 |
| 7,039,759 B2 * | 5/2006 | Cheng et al. | 711/115 |
| 7,039,780 B2 * | 5/2006 | Taussig et al. | 711/165 |
| 2002/0147882 A1 * | 10/2002 | Pua et al. | 711/103 |

* cited by examiner

PORTABLE DATA CONVERTING AND PROCESSING STORAGE DEVICE WITH STANDARD INTERFACE WHEREIN THE BODY UNITY DOES NOT INCLUDE ANY BUILT-IN FLASH MEMORY

FIELD OF TECHNOLOGY

The present invention relates to a data processing device with standard data interface, particularly to a portable data converting and processing device with standard data interface, which can integrate various data processing device and storage device conveniently. It belongs to computer peripheries.

BACKGROUND TECHNOLOGY

Original storage units of computers store the data by means of magnetic medium, floppy disks and hard disks now used in computers are both magnetic storage devices. Magnetic storage devices can be made large storage easily, but they are usually short-lived and unreliable. Furthermore, actual mobile storage devices can't be moved really, most of them can't be carried conveniently just because of their great cubage, such as external hard disk, external CD-writer, ZIP, MO, etc. These storage devices can be large storage capacity, but not mobile enough. As to portable storage device, such as floppy disk, not only the special driver for it is large in cubage, energy consuming and noise, but also it runs slow and physical damages easily. As the development of semiconductor, capacity of non-losable solid storage unit is becoming larger and larger, while the price of it is becoming lower and lower. Therefore, the replacement of floppy disks and hard disks by solid storage disks will greatly enhance the work of computer and data reliability. There are various solid storage disks in existence, such as CF card, MMC card, SMC card and non-losable solid storage units with USB interface. They communicate with PC via their own interfaces.

Because different card has different structure, PC must have various interfaces to access data from various solid storage devices listed above. This will not only add different electric connection interfaces to PC's mainboard, but also make PC and its peripheries complex.

Many standard data interfaces at present, such as USB or IEEE394, have been the new-style interfaces and widely used in PC. Non-losable storage medium such as flash memory is better than magnetic medium, and storage units based on it don't require complicated driver. So storage units based on such medium are replacing existing portable storage devices gradually.

On the other hand, integrated circuit card consists of one or more integrated circuit chips and is encapsulated to be a portable card. This card has the ability of temporary or permanent data storage, and data can be accessed from exterior or processed by itself. This card also has the ability of algebraic operation and logical operation, which can make it identify and respond external information and process data by itself. As an integrated circuit card, IC card is a card which has microprocessor, large storage, and other integrated circuit chip embedded in substrate made of plastic. It comes forth as the development of semiconductor and the demand for information security of people. Since the most advanced semiconductor-manufacture and information security technique are used in IC card, it has four characters in below comparing other cards: 1. Large capacity of storage: it has internal memory units, such as RAM, ROM, EEPROM, etc. the storage varies from several bytes to several million bytes. Much information, such as character, voice, picture and image, can be stored in the card. 2. High security: IC card achieves its security both by the hardware and the software. The character of accessing in different part of the card can be controlled respectively. Password can be set in storage units of IC card, and if accessed illegally, the card will destruct automatically, that is the card can not be read or written. 3. Less requirement of network: highly reliability and security of IC card reduce the requirement in real-time performance and sensitivity of computer network. This is good for using in the network which has bad quality.

Being reliable and safe, IC card is used wider and wider. IC card appears in financial products, private consuming products, etc. Thus, it is unavoidable that PC should integrate IC card under the circumstance of the increasing amount of IC card year after year. For the same reason, the demand for IC card reader will grow gradually. Because there has no IC card reader in present PC, these PC can't use IC card to identify information. Besides, communication interfaces in PC are limited, while existing data input are various both in type and manner, so there always have not enough interfaces in PC, and some external apparatus only can be plugged in by turns to communicate, or even can't be connected to PC directly.

At present, products based on above technique include USB memory, CF card reader, SMC card reader, and IC card identifier. Seen from designing and using, there neither has any common components adopted in above products, nor has any flexible combination of above products. Capacity or function of any kind of product is fixed, and can't be combined with each other. Then customers have to buy and use each respectively, and have no way to upgrade them. As to manufacturing products, the cost can't be reduced and output can't increase easily just because there has no appropriate modules for these products. Furthermore, in order to perform identifying, wireless data communicating, etc, PC is integrating more and more interfaces and data processing devices, but these configurations are not convenient.

SUMMARY OF THE INVENTION

The main object of the present invention is to provide a portable data converting and processing device with standard data interface, thereof convenient and easy-used communication between its storage units and PC is constructed, it basically comprises a body unit including connectors and the data processor to ensure the data controlling and transmitting, and an external functional unit or storage unit as peripheries, which can be conveniently pull out and plug in.

The second object of the present invention is to provide a portable data converting and processing device with standard data interface, which comprises more than one common communication interfaces with PC, obtaining the ability of interface converting and expanding.

The third object of the present invention is to provide a portable data converting and processing device with standard data interface, the data processor of which is a connector-controller, a conversion-controller with functional processing, or an integrative or separate combination of them, the conversion-controller can be a CF card processor, a MMC card processor, a SD card processor, a SMC card processor, an IBM Micro Drive processor, a USB processor, a RF processor, an IC identification processor, or a multi-functional processor formed by the combination of the above cards. The storage unit is connected to the conversion-controller to integrate or expand more function.

The fourth object of the present invention is to provide a portable data converting and processing device with standard data interface, thereof various functional units which need to connect to the computer via standard interfaces can be easily connected, for example, the body unit of data processor can conveniently integrate with standard infrared receiving part, RF module or identifying module if the body unit has no inferred receiving part, RF module or identifying module.

The fifth object of the present invention is to provide a portable data converting and processing device with standard data interface, the connectors of which are standard connectors for functional processor or storage devices so that they can be produced and assembled industrially and can be changed and upgraded in using easily.

The objects of the present invention are achieved by the following technical solution:

A portable data converting and processing device with standard data interface comprises: a standard data interface connector (such as a USB connector or a CF interface) and a data processing controller, wherein the data processor and the connector are integrated to form the processor body unit, and an electric interface for external unit are set in said processor body unit.

The data processor can be a connector-controller, a conversion-controller with functional processing, or an integrative or separate combination of them. The conversion-controller can be a CF card processor, a MMC card processor, a SD card processor, a SMC card processor, an IBM Micro Drive processor, a USB processor, a RF processor, an IC identification processor, or a multi-functional processor formed by the combination of the above cards. An electric interface matched for the connection with the processor body unit is set at one end of the conversion-controller, and an electric interface matched for the connection with the external unit is set at the other end.

An electric interface connected with the external unit is set in the processor body unit. The electric interface connecting the processor body unit with the conversion-controller of the separate combination can be standard USB interface, CF card connector, MMC card connector, SD card connector, SMC card connector, IBM Micro Drive connector, RS-222, COM port, IEEE1394 or PS/2.

Besides, the external unit can be an external processor or a data storage device, such as non-losable storage device.

The external processor can be an infrared transceiver, a RF processor, an identifier processor, or a multi-functional processor of the combination of above.

The configuration of the standard data interface connector can be plug-style or socket-style.

In detail, the external unit connects to the covering body around the body unit by leading grooves, and their relationship is like the structure of drawers. The electric interface is elastic-touch connection. Of course, the external unit can be elastically fastened upon the covering body around the body unit; there are elastic fasteners in the covering body of the external unit, and corresponding taches in the covering body of the body unit. An electric connection interface is set in the corresponding place between the external unit and the body unit.

Furthermore, there is a separate lid at the tail of the covering body of body unit, there also has a container in the body unit and the external unit is put into this container. The electric interface of the external unit and the controller is elastic-touch connection or plug-in connection. The lid connects to the body unit by glide-connection or fasten-connection as needed.

Compared with prior art, the present invention has advantages as follows:

1. Constructing convenient and easy-used communication with PC. The present invention comprises three modules: interface, processor and external plug-in unit, wherein the interface and the processor are integrated, the interface can be various standard interfaces, while the processor can integrate the converting circuits for various storage cards so that the processor can access data from various cards. If integrating with IC card, the processor will obtain the ability of identifying IC. If the processor doesn't have any acting integrated module, the external plug-in unit can be various converting or functional module. The external plug-in unit will obtain the ability of mobile storage if appended storage unit, such as flash memory.

2. Capacity and function of the processor can be expanded and upgraded at will, and data can be converted between various formats, reducing cost and saving resources.

3. Configurations of the connectors are standard modules, thus it can be produced and assembled flexibly in industrial application.

4. The external units are peripheries to the present invention, and they can be assembled or disassembled easily and conveniently.

5. Many extended common interfaces are appended. Then whether all interfaces of PC or interfaces of the present device are occupied, users can choose to use interfaces of other devices in the present device. So the present invention can make the host computer which doesn't have enough communication interfaces have additional communication interfaces for other devices.

6. Since the standard data interfaces and controller used in the present invention are open standard units, the controller can connect to the other units needed to communicate with PC, such as infrared receiver or other wireless transmitting devices or socket for IC card.

PREFERRED EMBODIMENTS OF THE INVENTION

The present invention will be explained in detail with reference to drawings and embodiments.

Figure 9:
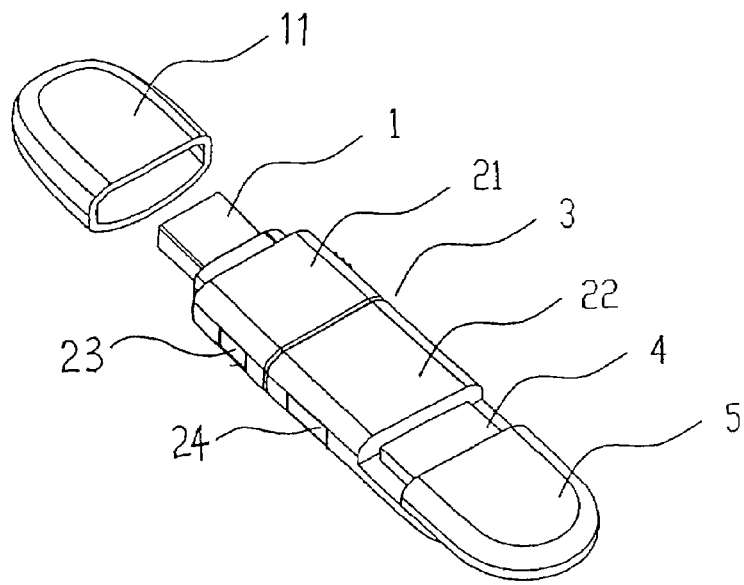
FIG. 9 is the diagram showing the structure of the present device with several interfaces.

The present invention is to provide a portable data converting and processing device with standard data interface comprising three modules: interface, processor and external plug-in unit. The interface and the processor are integrated. The interface can be various standard interfaces, and the processor can integrate the converting circuits for various storage cards so that the processor can access data from various cards. If integrating with IC card, the processor will obtain the ability of identifying IC. If the processor doesn't have any acting integrated module, the external plug-in unit can be various converting or functional module. If the external plug-in unit has storage unit, such as flash memory, the external plug-in unit can obtain the ability of mobile storage. The diagram of the circuit is shown in FIG. 9.

As shown in FIG. 1 to FIG. 12, the present invention consists of a connector 1, a data processor 2, a lid 3 at the front end of the connector 1, and an external unit 4, wherein the connector 1 is a USB connector, and it is fixed on the data processor 2 to form the body unit 3. The data processor 2 consists of a connector-controller and a conversion-controller with functional processing, and the conversion-controller can be a CF card processor, a MMC card controller, a SD card processor, a SMC card processor, an IBM Micro Drive processor, a USB processor or a multi-functional processor formed by the combination of the above cards. The conversion-controller can integrate IC chips so that the present invention will gain the ability of encrypting data and identifying. The conversion-controller can be an infrared receiving/transmitting module or a RF processor, thus PC with this controller in will have the ability of infrared transmitting/receiving or RF processing. The conversion-controller also can be an integration of these modules. Highly integrated like this, the present invention can meet the usage of various portable and mobile electronic consumables better; portability and synthesis in data processing with standard interfaces of the present invention are also embodied.

Being a physically separate part, the external unit 4 can be integrated with the body unit 3 and electrically connected to the data processor 2. Thus, the storage unit can be changed at will, e.g. if the function of the external unit 4 needs to be expanded or the data storage becomes inadequate, just change it.

The present invention is just used as a common device with standard data channels. Since the standard connector 1 and data processor 2 are used in the present invention, users can assemble any unit with standard connectors to the present device at will to meet the demand for data storage, data format processing or any other control. Thus, not only units with standard data channels are full used, but also the flexibility of upgrade and storage enlargement of various portable data storage or processors are greatly increased, cost of these functional devices is reduced and resources of units are saved.

Embodiment 1

Figure 1:
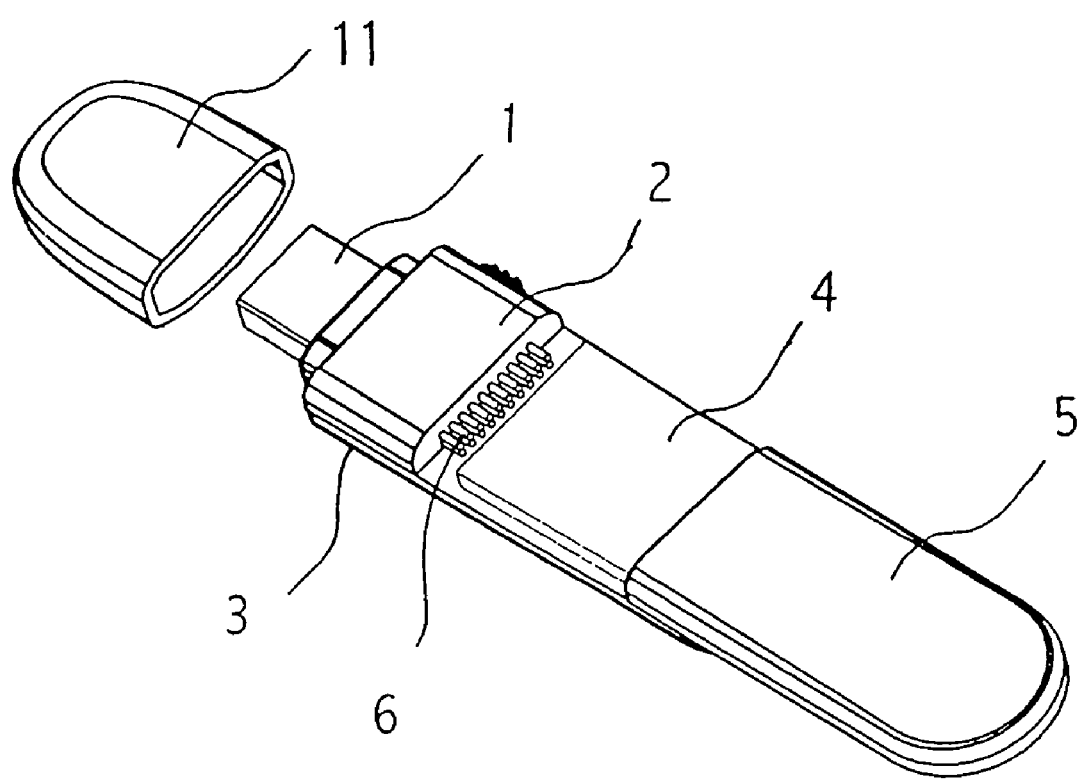
FIG. 1 is the diagram showing the three-dimensional disassembled sketch of one embodiment of the present invention.
Figure 2:
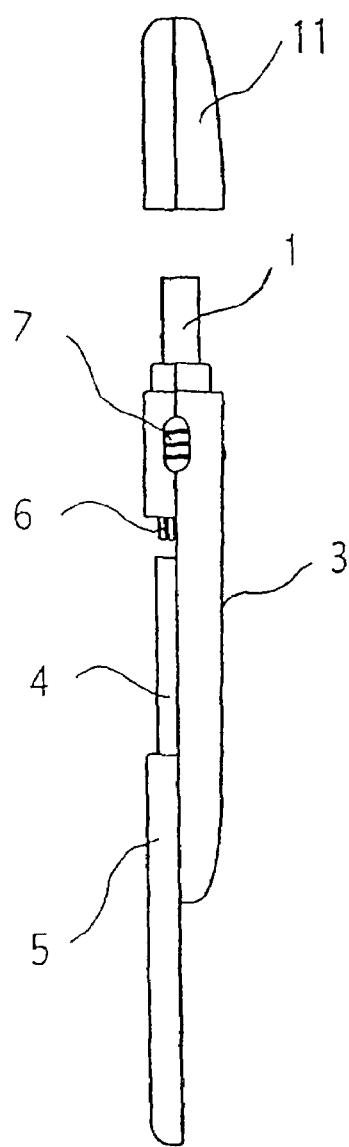
FIG. 2 is the diagram showing the side view of FIG. 1.
Figure 3:
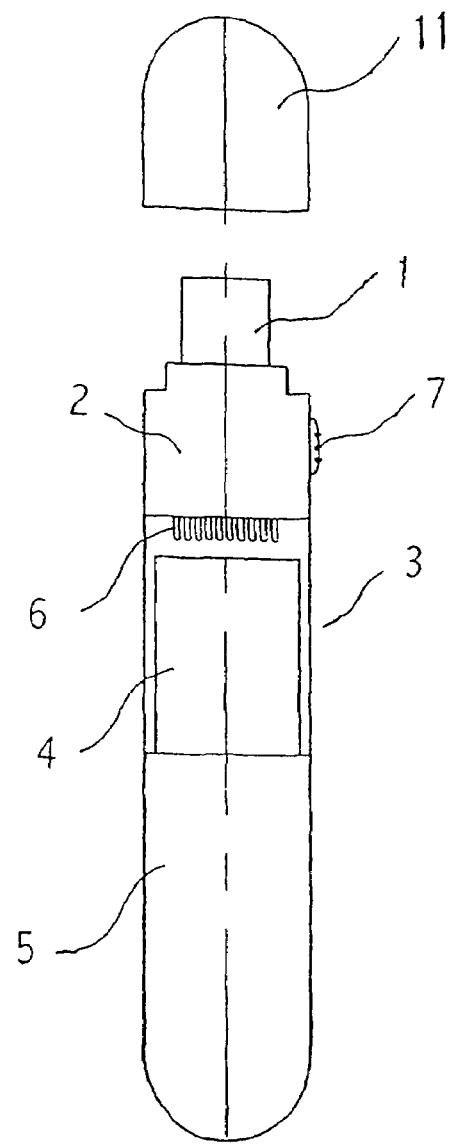
FIG. 3 is the diagram showing the front view of FIG. 1.

As shown in FIG. 1, FIG. 2 and FIG. 3, the configuration of the present invention is similar to that of mobile phone, battery of which is separate. There is a separate rear-lid 5 in the rear of the covering body of the body unit 3, this is to say that the rear-lid 5 can be opened or closed. In detail, the rear lid 5 connects to the body unit 3 glidingly by the leading grooves, there also can set elastic fasteners, such as tenons, in the rear-lid 5 to fasten it upon the body unit 3. In this embodiment, the body unit 3 of the present invention is the integrated body 3 of connector-controller and conversion-controller with functional processing. There is a container for the external unit 4 in the body unit 3, and it is covered by the rear-lid 5. The electric interface 6 of the external unit 4 and the data processor 2 is elastic-touch connection. The electric interface 6 shown in FIG. 1 is plug-in connection. When changing the external units 4, just open the rear-lid 5 and take the external unit 4 out, then put a new external unit 4 into the container.

The external unit 4 can be an external processor or a data storage device, such as non-losable storage device. The external processor can be a CF card processor, a MMC card processor, a SD card processor, a SMC card processor, a MD card processor, an IC identification processor or a multi-functional processor formed by the combination of the above cards. For example, if there is no converting modules of CF card processor, MMC card processor, SD card processor, SMC card processor, or MD card processor in the body unit 3, but the converting module is needed to communicate with PC in practice, users can plug the multi-card converting module directly in the body unit 3, and then plug the present invention in PC.

Furthermore, a switch 7 for controlling read/write status is set in the body unit 3.

The external unit 4 integrates with the rear-lid 5, and the integration connects to the body unit 3 by means of leading grooves or fasteners. The electric interface 6 can be elastic-touch connection or plug-in connection. In order to be standardized, interfaces can be standard interfaces, such as USB interface or other standard interfaces.

A front-lid 11 is set at the front end of the device to protect the connector 1. A switch 7 for controlling read/write status can also be set.

Embodiment 2

Figure 4:
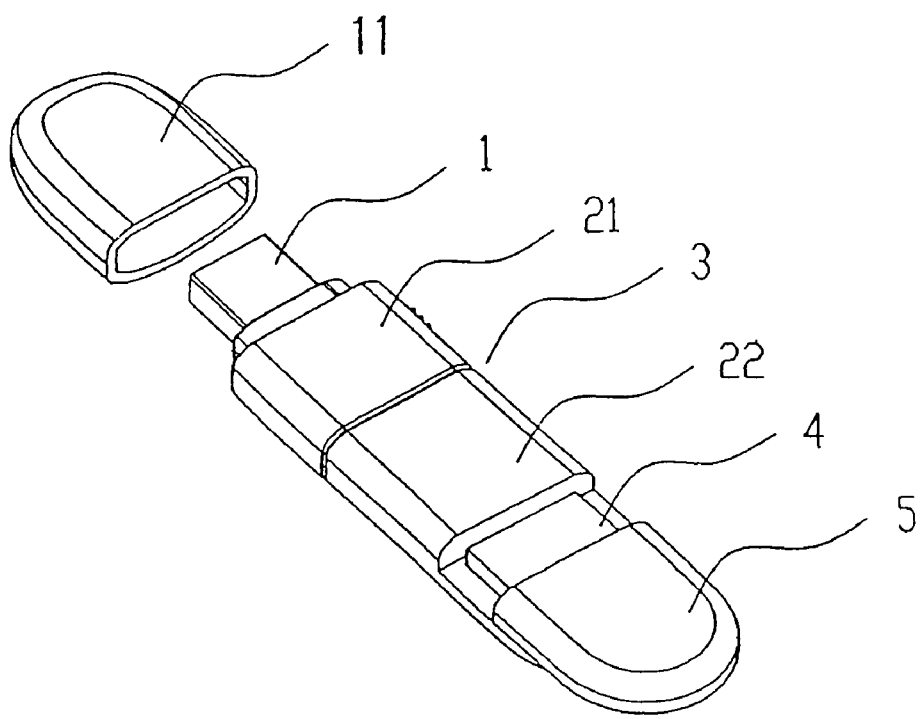
FIG. 4 is the diagram showing the three-dimensional disassembled sketch of another embodiment of the present invention.

As shown in FIG. 4, the body unit 3 is composed of a connector-controller 21 and a conversion-controller 22 with functional processing separately. The conversion-controller 22 can be a multi-card converting module, a RF processor, an IC identification processor or a multi-functional processor formed by the combination of the above processor. At one end of the conversion-controller 22 is the electric interface to the connector-controller 21, and the other end is an electric interface to the external unit 4, which can be connected one by one. The interface also can be standard USB interface, CF card connector, MMC card connector, SD card connector, SMC card connector, IBM Micro Drive connector, RS-222, COM port, IEEE 1394 or PS/2.

Embodiment 3

Figure 5:
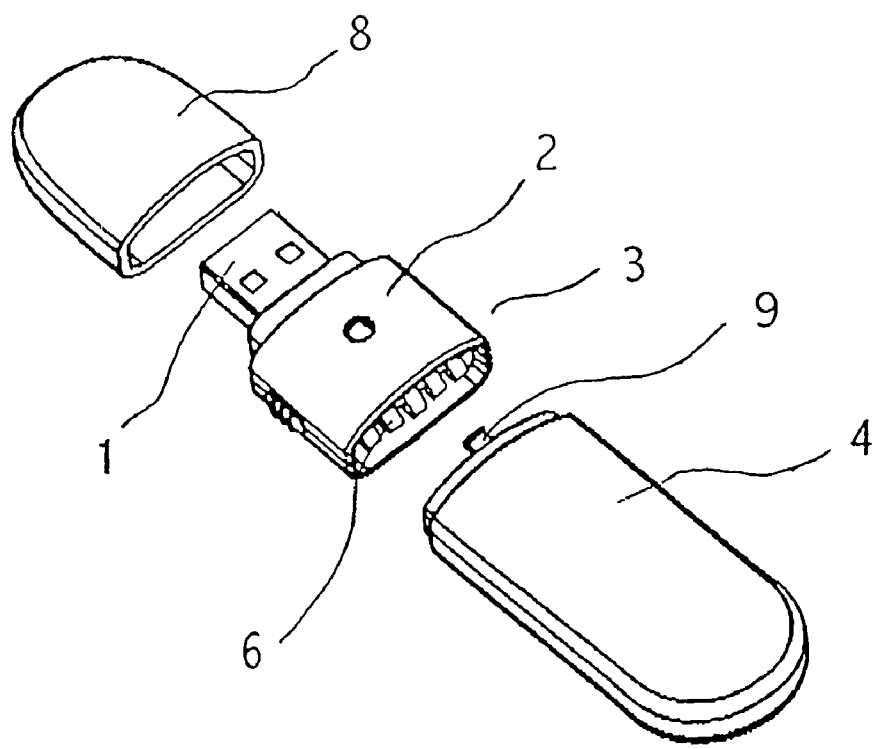
FIG. 5 is the diagram showing the three-dimensional disassembled sketch of the third embodiment of the present invention.

As shown in FIG. 5, the external unit 4 is separate from the body unit 3, and they are fastened elastically. The elastic fastener 8 is set in the covering body of the external unit 4, and corresponding tache is set in the body unit 3. When assembling, the fastener is fastened in the tache. An electric connection interface is set at the electric interface 6 of the external unit 4 and the data processor 2.

Embodiment 4

Figure 6:
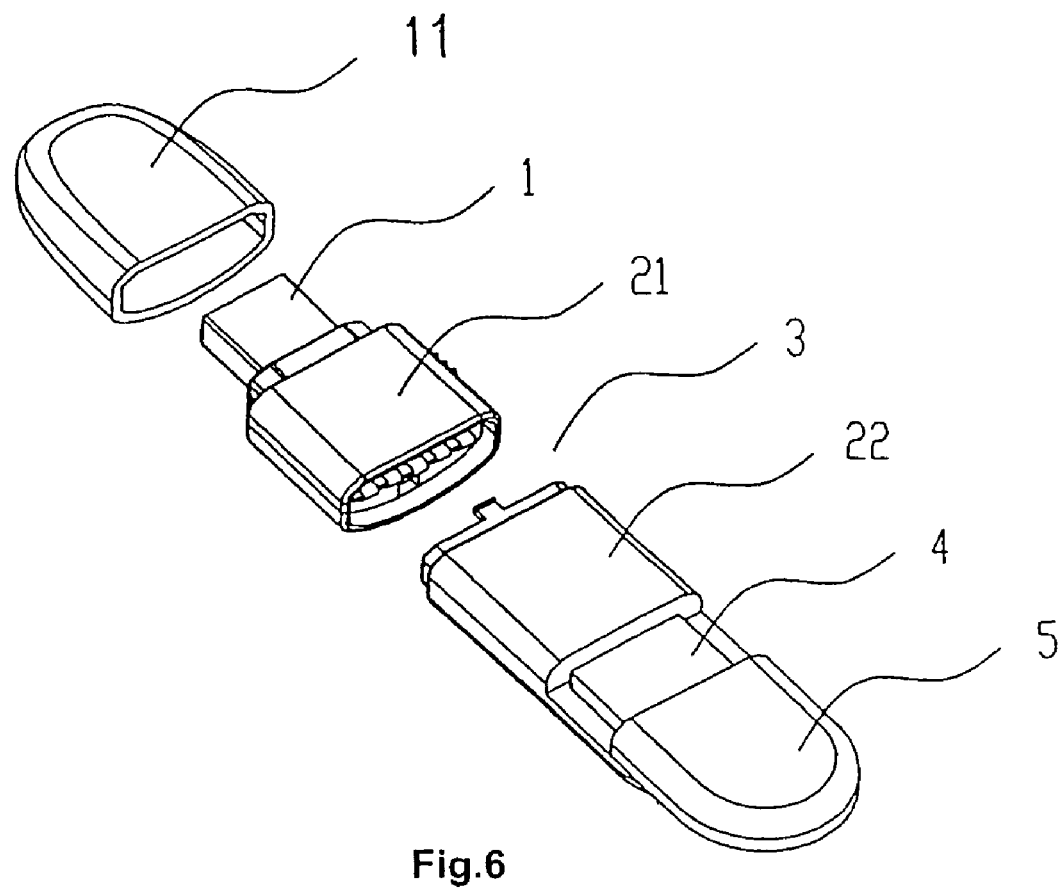
FIG. 6 is the diagram showing the three-dimensional disassembled sketch of the fourth embodiment of the present invention.

As shown in FIG. 6, the body unit 3 is composed of a connector-controller 21 and a conversion-controller 22 with functional processing separately. The connection between them is same as that in embodiment 3. The conversion-controller 22 can be a multi-card converting module, a RF processor, an IC identification processor or a multi-functional processor formed by the combination of the above processor. At one end of the conversion-controller 22 is the electric interface to the connector-controller 21, and the other end is an electric interface to the external unit 4, which can be connected one by one. Similarly, the interface also can be standard USB interface, etc.

Embodiment 5

Figure 7:
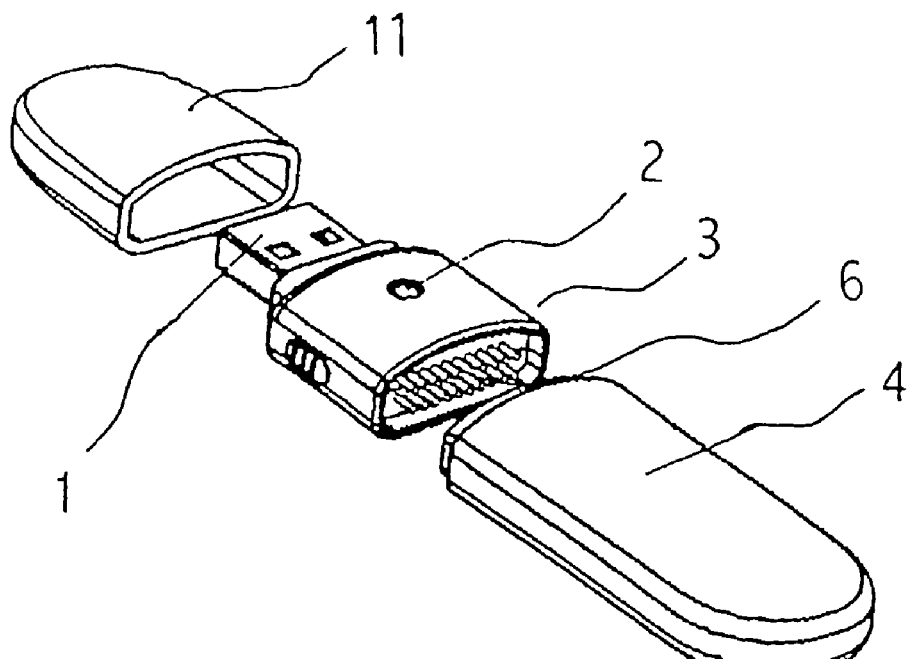
FIG. 7 is the diagram showing the three-dimensional disassembled sketch of the fifth embodiment of the present invention.

As shown in FIG. 7, the external unit 4 is separate from the body unit 3, and they are connected by plug-in, similarly to that of plug and socket. An electric connection interface is set at the electric interface 6 of the external unit 4 and the data processor 2.

Besides, the connector 1 can be designed as a socket.

The standard interface protocol is used for data transmission between each module, such as USB protocol or I2C protocol.

Embodiment 6

Figure 8:
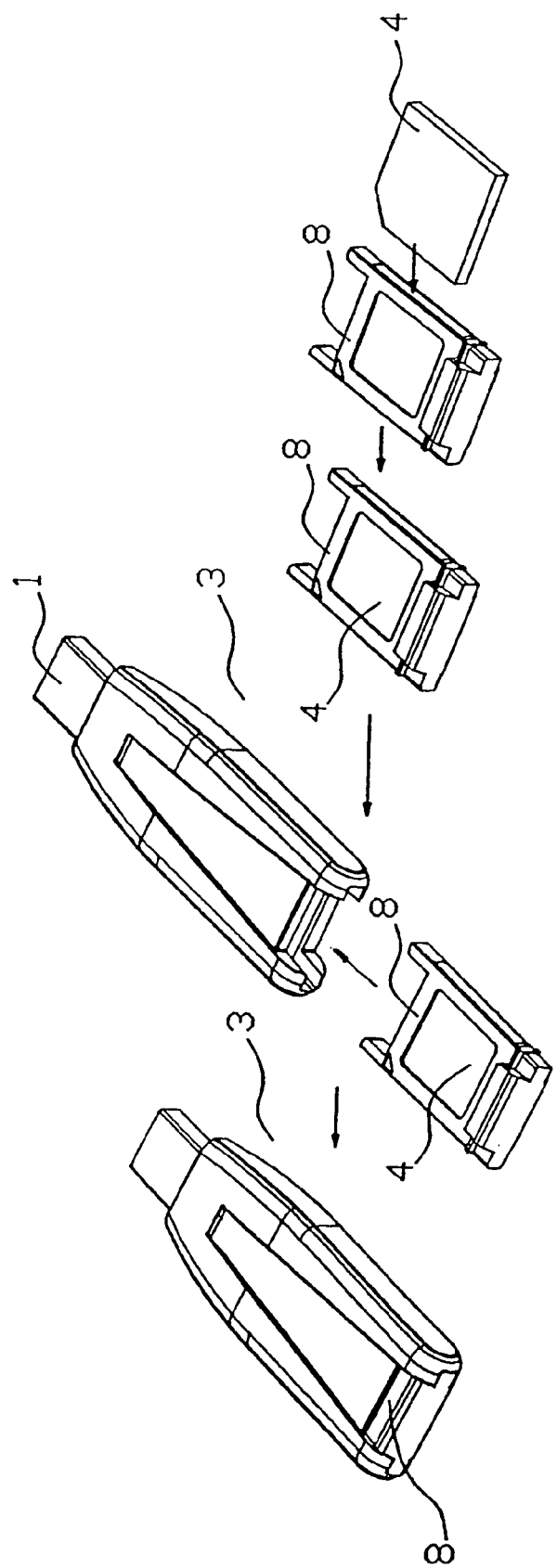
FIG. 8 is the diagram showing the disassembled and assembled sketch of a preferred embodiment of the present invention.

As shown in FIG. 8, the external unit 4 can be assembled as follows: the external unit 4, such as storage device, can be put into the bracket 8, and the bracket 8 is then plugged in the body unit 3 to form the entire device.

Embodiment 7

As shown in FIG. 9, several extended common interfaces 23 and 24 can be appended to the body unit. The interface can be RS-222, COM, IEEE1394, USB, PS/2 or Parallel Port/IEEE-1284 etc. Thus, whether all interfaces of PC or interfaces of the present invention are occupied, users can choose to use the interfaces of other units in the present device. So the present invention can provide additional interfaces to those host computers that short of interfaces, and can convert interfaces using different protocols.

Figure 10:
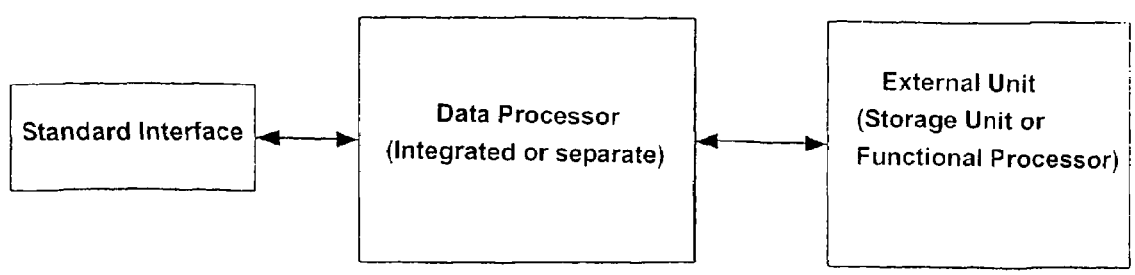
FIG. 10 is the diagram showing the whole circuit of the present invention.
Figure 11:
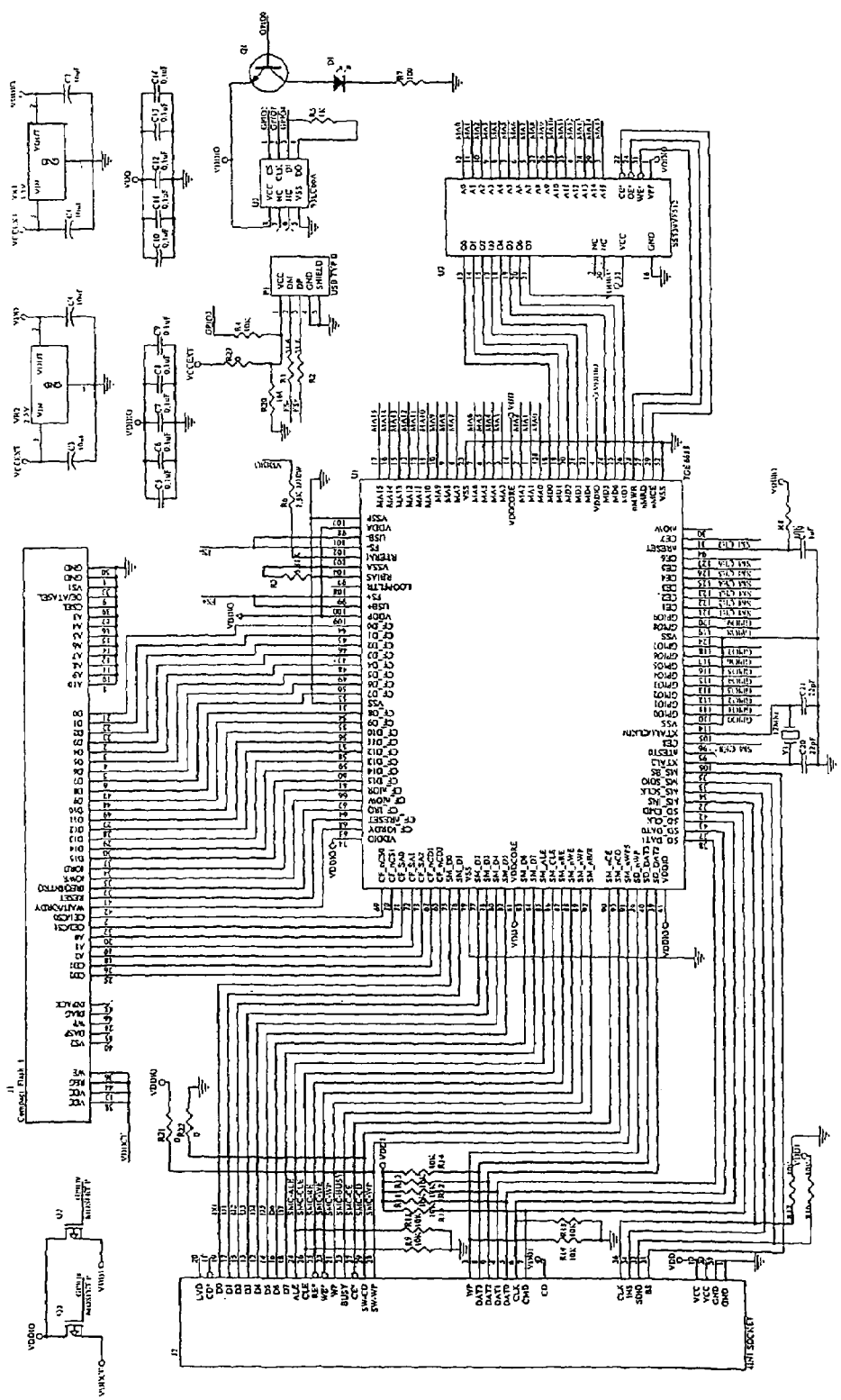
FIG. 11 is the first diagram showing the principle of the converting circuit for various storage cards of the present invention.
Figure 12:
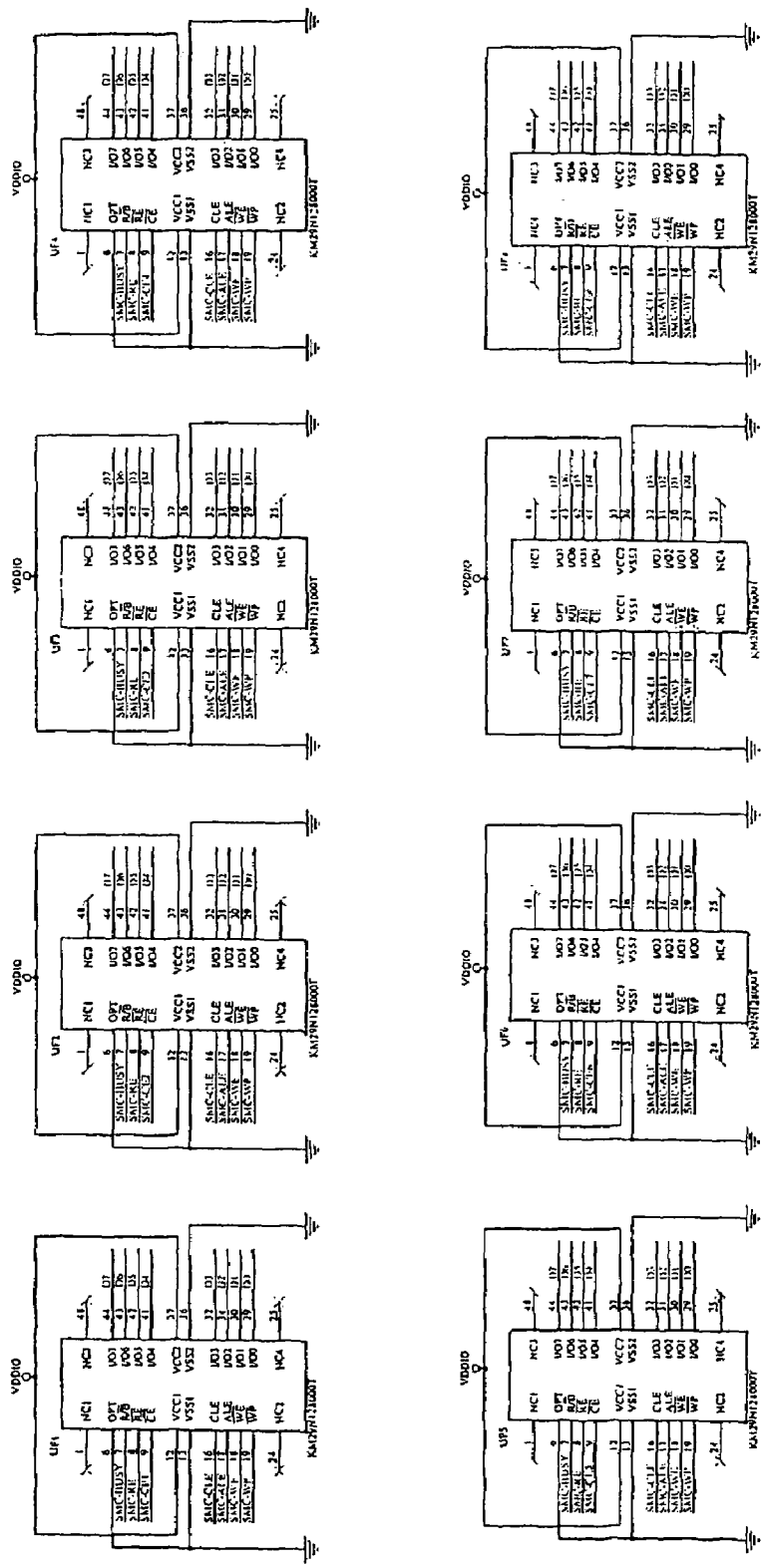
FIG. 12 is the second diagram showing the principle of the converting circuit for various storage cards of the present invention.

FIG. 10 illustrates the circuit of the present invention, wherein the integration of the storage card converting circuits is shown in detail in FIG. 11 and FIG. 12. It can support the access to various cards, such as MMC, SD, CF, MD or SMC, and convert different interfaces, and also can directly read or write flash storage medium UF1 to UF8. Thus, it can transmit data between computers and those cards. Those cards work in similar ways, that is, the socket can detect the plug-in status of cards and use a pin to detect the plug-in status. When a card is detected, the data would be read from the card and then transmitted. Because MMC card and SD card are compatible, CF card and MD card are compatible in five kinds of card, only three kinds of socket are needed. In this embodiment, the interfaces for intelligent card, memory stick and security card is appended to J1 in FIG. 11; the interfaces for CF card 1 and CF card 2 is appended to J2. The flash memory medium UF1-UF8 can be read or written via wires CE1-CD6 of converting processor chip TGE6688 and SMC connector.

Accessing circuits for above cards can be integrated as a module, or more than one module, that is, they can be integrated into the processor, or be external units to the body unit.

the principle of integrating IC card identification circuit and expanded interface with the present invention.

Figure 13:
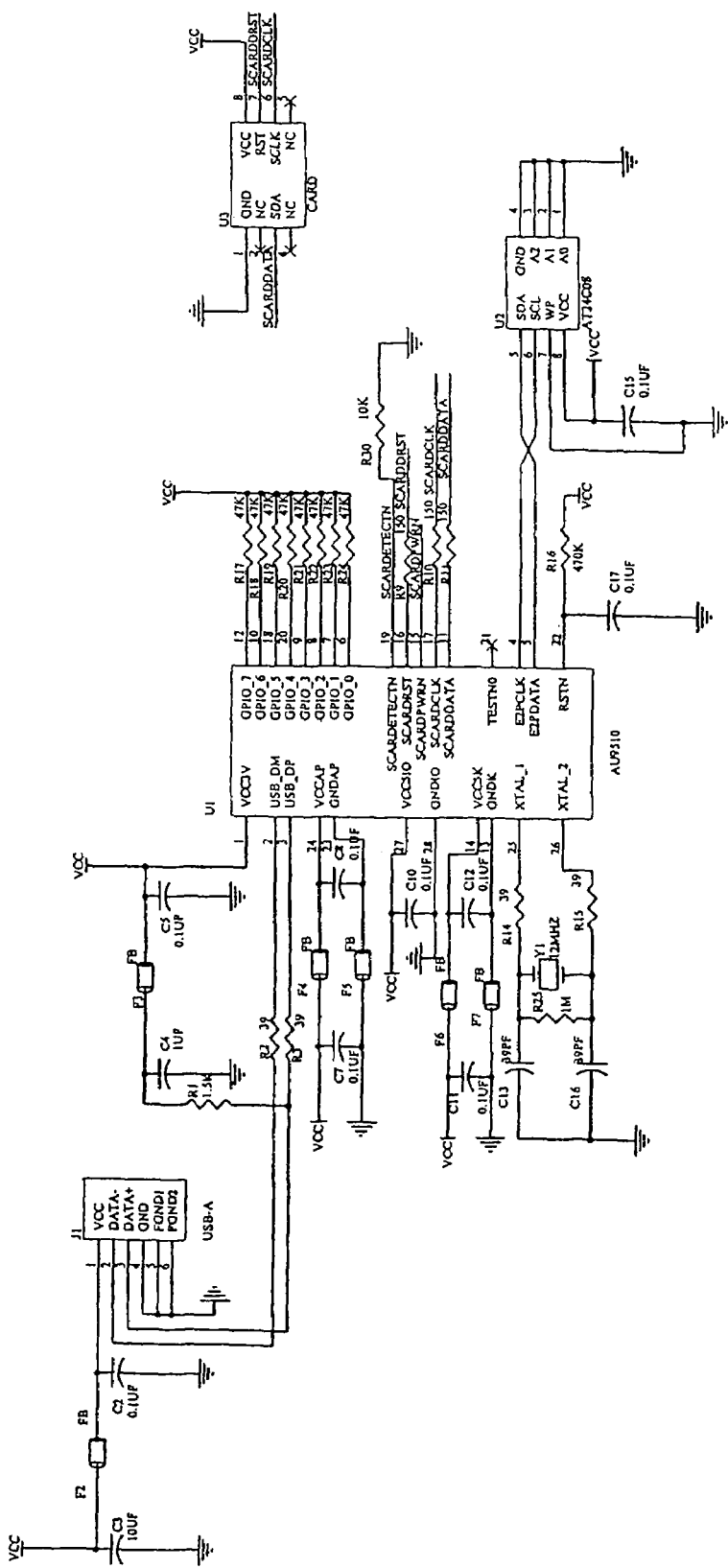
FIG. 13 is the first diagram showing the principle of integrating IC card identification circuit and expanded interface with the present invention.
Figure 14:
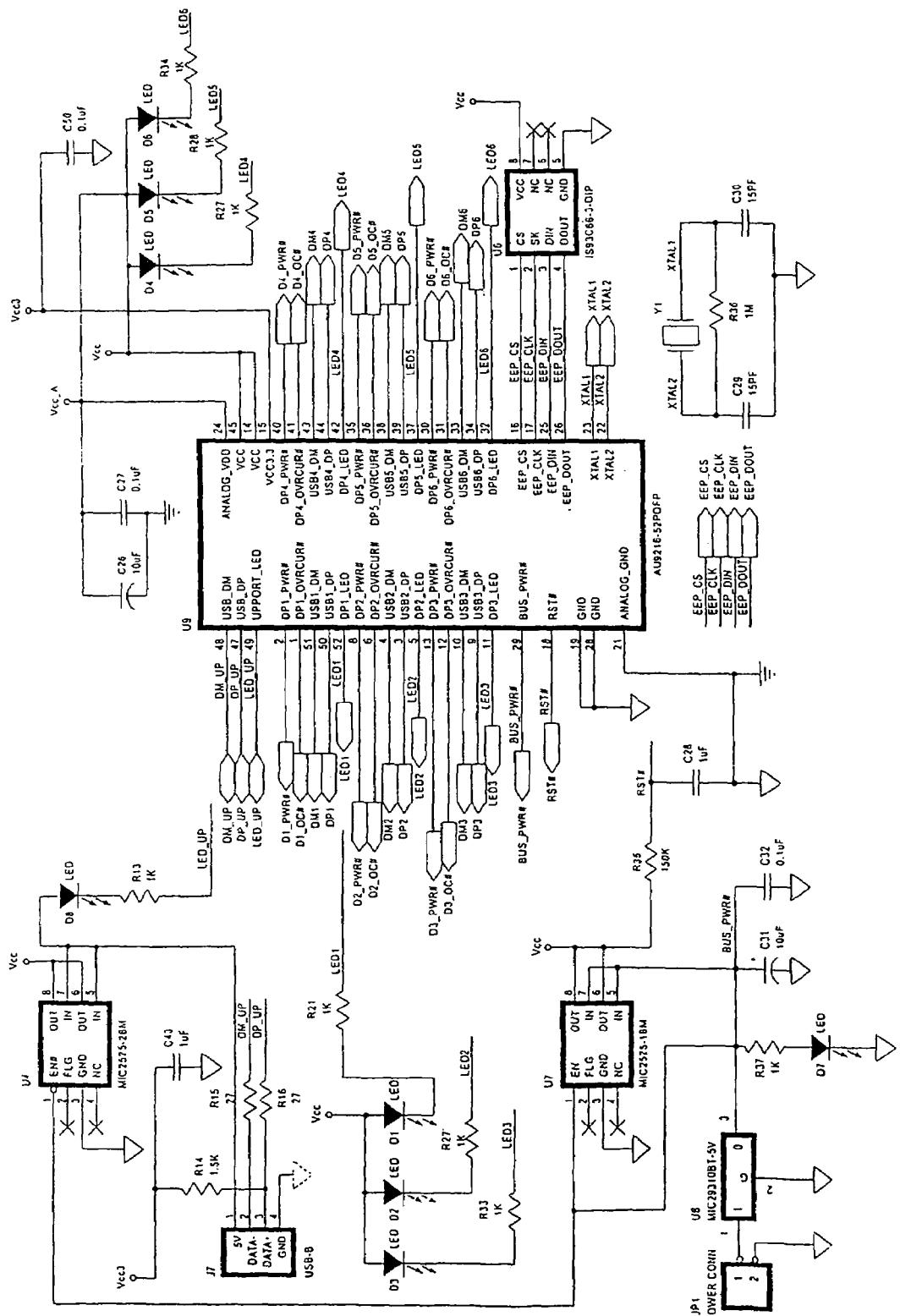
FIG. 14 is the second diagram showing the principle of integrating IC card identification circuit and expanded interface with the present invention.
Figure 15:
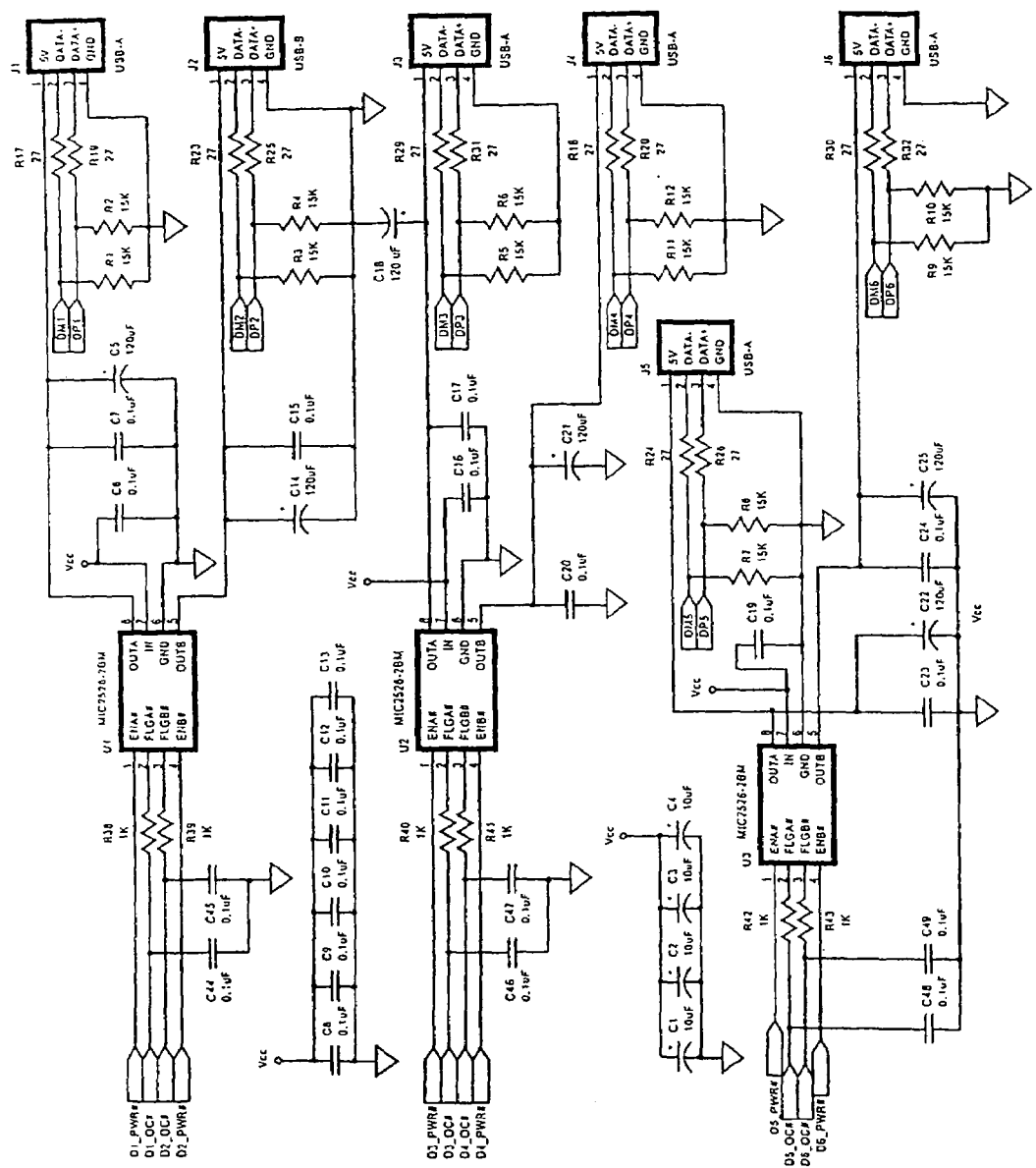
FIG. 15 is the third diagram showing the principle of integrating IC card identification circuit and expanded interface with the present invention.

Additionally, the principle of the processor integrated with IC card identification circuit and the body unit with more than one extended interface is shown in FIG. 13 to FIG. 15. The IC card identification and conversion circuit is the card reader U1 and U3 shown in FIG. 13. FIG. 15 shows the extended interfaces, FIG. 14 shows the processor and power supply. The present invention can provide more than one interfaces, such as USB-A and USB-B etc, for other devices. When setting converting circuit suited, the interfaces can be various. The USB interface 3 or IEEE-1394 interface 4 can be appended to the body unit and the common interface 2 used to communicate with PC will be greatly extended. Standard interfaces in the body unit can be RS222, COM Port, IEEE1394, USB, PS/2 or Parallel Port/IEEE1284.

Above embodiments are used only to explain the present invention, but not to limit the present invention. In despite of the detailed description of the present invention with referring to above preferred embodiments, it should be understand that various modifications, changes or equivalent replacements can be made by those skilled in the art without depart from the spirit and scope of the present invention. All of the modifications, changes or equivalent replacements should be covered in the append claims of this application.

The invention claimed is:

1. A portable data converting and processing device with standard data interface, comprising a standard data interface connector and a data processing controller, characterized in that said standard data interface connector is integrated with said data processing controller to form a body unit, the body unit does not include any built-in flash memory, an electric interface is set in the body unit to connect to an external unit; said data processing controller comprises a conversion-controller which is a multi-functional processor formed by combination of MMC card processor, a SD card processor, a CF card processor, a MD card processor, a SMC card processor, and IBM Micro Drive processor and has a converting circuit which supports MMC card, SD card, CF card, MD card, SMC card, and flash storage medium UF1 to UF8; said external unit comprises a data storage device; said data storage device is a non-losable storage device.

2. The portable data converting and processing device with standard data interface according to claim 1, characterized in that an electric interface matched for the connection with the body unit is set at one end of said conversion-controller, and an electric interface matched for the connection with the external unit is set at the other end of said conversion-controller.

3. The portable data converting and processing device with standard data interface according to claim 1, characterized in that said standard data interface connector is plug-style or socket-style.

4. The portable data converting and processing device with standard data interface according to claim 1, characterized in that said external unit or said conversion-controller is connected to a covering body of the body unit by a leading groove connection, or a plug-in connection, or an elastic-fastening connection.

5. The portable data converting and processing device with standard data interface according to claim 1, characterized in that an elastic fastener is set in a covering body of said external unit and a tache is set in a corresponding place of the covering body of the body unit.

6. The portable data converting and processing device with standard data interface according to claim 1, characterized in that a separate rear-lid is set at the rear of a covering body of said body unit; thus a container is formed between the body unit and the rear-lid, and the external unit or the conversion-controller is put into this container.

7. The portable data converting and processing device with standard data interface according to claim 1, characterized in that said external unit is put on a bracket, which is inserted in grooves in a covering body of the body unit.

8. The portable data converting and processing device with standard data interface according to claim 1, characterized in that an electric interface for the external unit is set in said processor, wherein the interface can be standard USB connector, CF card connector, MMC card connector, SD card connector, SMC card connector, IBM Micro Drive connector, RS-232, COM port, IEEE1394 or PS/2.

9. The portable data converting and processing device with standard data interface according to claim 1, characterized in that more than one data interfaces are set in a covering body of said body unit said interfaces can be USB interface, CF card connector, MMC card connector, SD card connector, SMC card connector, IBM Micro Drive connector, RS 222, COM port, IEEE 1394 or PS/2.

* * * * *